Patented Mar. 7, 1944

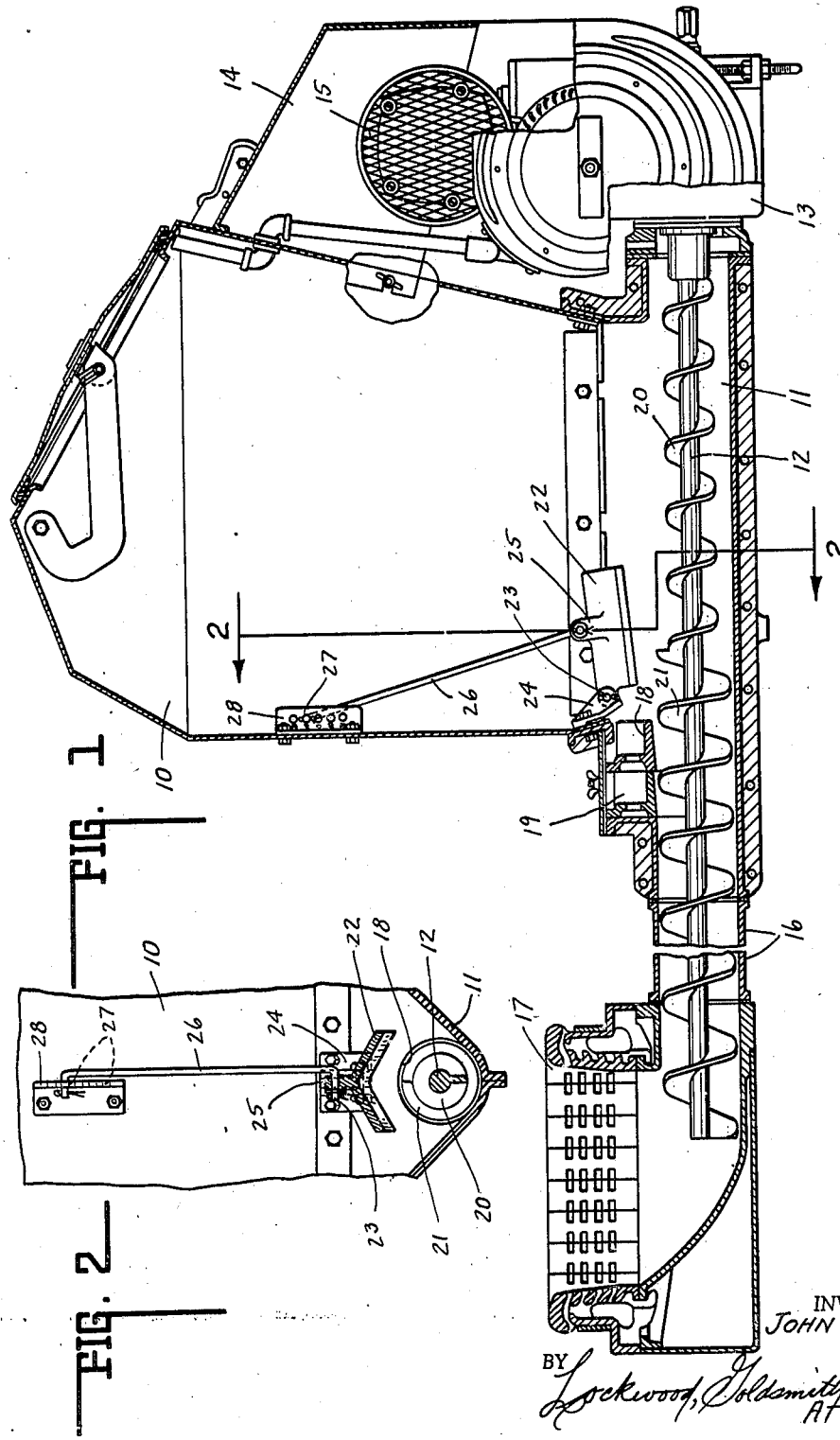

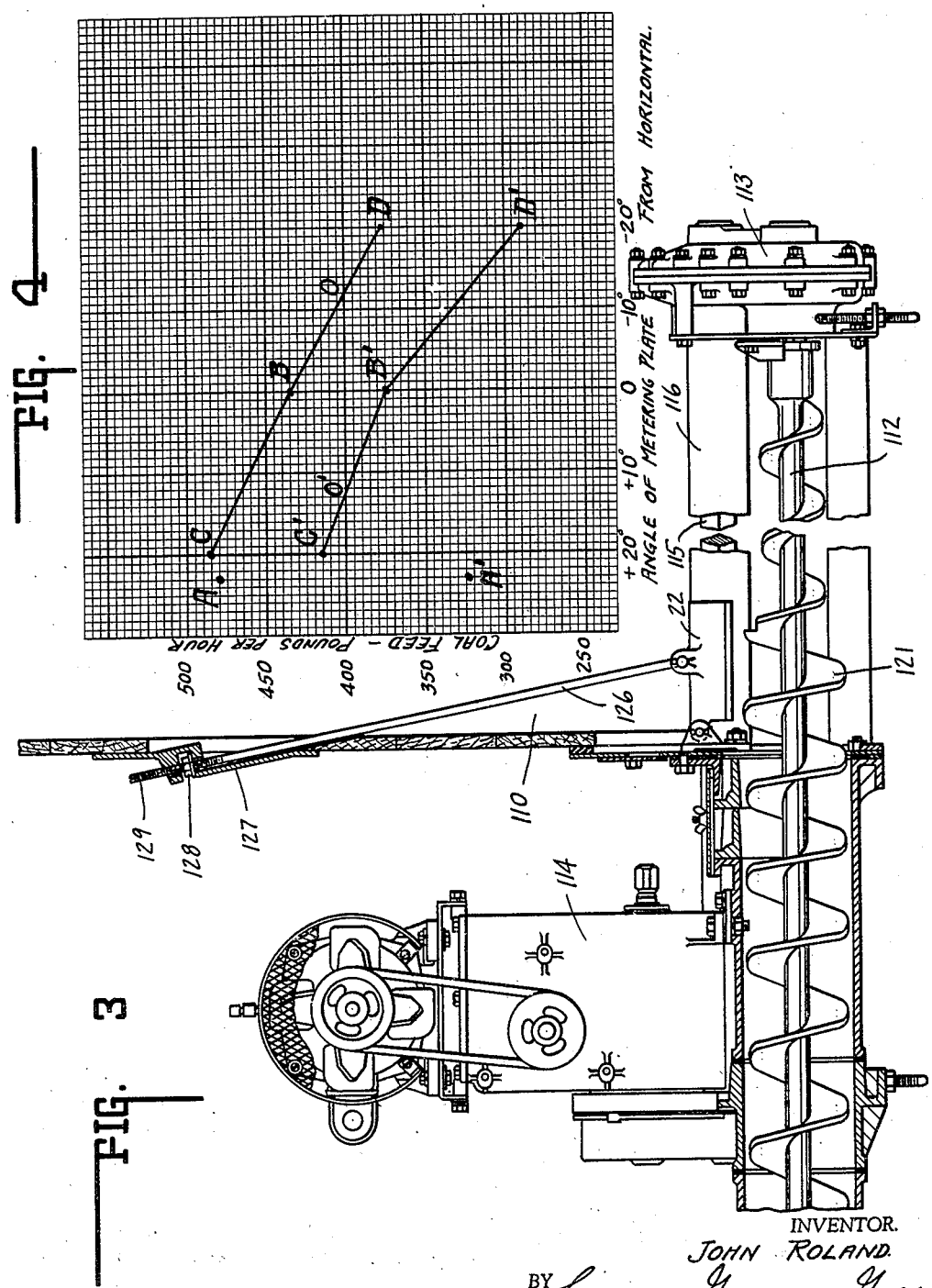

2,343,707

UNITED STATES PATENT OFFICE 2,343,707

METERING DEVICE FOR SCREW FEEDS

John Roland, Indianapolis, Ind., assignor to Schwitzer-Cummins Company, Indianapolis, Ind., a corporation Application August 7, 1942, Serial No. 454,053

5 Claims. (Cl. 221—118)

This invention relates to a device for metering or controlling the feeding of solid materials such as coal, coke, grain, aggregates or the like, from a hopper or bin may by means of the usual feed screw.

For example, difficulty has been experienced in the control of screw type stokers in that the rate of feed may vary considerably with different sized lumps of coal. This is particularly noticeable in stokers having feed screws with a step-down flight in the hopper. Some of the factors involved comprise variation in the bulk density (ratio of weight to volume) of the coal, as well as the variation in size of the lumps of coal, ranging from fine to coarse. This difficulty cannot well be overcome by changing the rate of feed by controlling of the speed of operation of the driving screw. The effect and disadvantage to the user of the stoker is two fold, namely, the causing of tight feed screws due to overfeeding, and "smoke back" due to underfeeding. Additionally, difficulty arises in controlling the ratio of feed in pounds per hour where the stoker is operated in different localities and with different types of coal. Thus, a stoker which is rated at a maximum feed of 400 pounds per hour may only be capable of reaching a maximum feed of 325 pounds per hour with one type of coal, but with another type will reach 475 pounds per hour.

It is the purpose of this invention to provide a metering device associated with the feed screw in the hopper or bin, which may be set or adjusted in respect to the feed screw to adapt the feed to a certain type of coal or other solid materials, and by setting it accordingly will have the effect of equalizing the feed for different types of materials by causing an increase of feed in respect to one type and a decrease in respect to another type. Such metering device, as herein more particularly set forth and described, may consist of a hinged V-plate extending over the feeding flights of the screw and adjustable at varying angles to and from said flights. By means of this arrangement the plate has the effect of leveling off any uneven feed from the rear of the hopper or bin, where, by reason of the character of the difficulty, the step-down flights of the screw may overfeed the material into the feeding flights thereof. Furthermore, the plate acts in the nature of an adjustable gate which in its raised position acts as a funnel to increase the feed to the feeding flights, and in its lowered position restricts the feed thereto.

The full nature of the invention will be understood from the accompanying drawings and the following description and claims:

Fig. 1 is a central vertical section through a stoker hopper and screw conveyor showing the metering device mounted therein. Fig. 2 is a section taken on the line 2—2 of Fig. 1. Fig. 3 is the same as Fig. 1, showing a modified form as applied to a bin feed. Fig. 4 is a chart illustrative of the operation.

In the drawings there is shown by way of illustrating one application of the invention, parts of a stoker including a bin or hopper 10 having a base 11 in which a feed screw 12 is driven through a suitable power transmission 13 from a motor enclosed within the motor cover 14 and protected by a screen 15. The hopper base is connected at its feeding end with a conveyor pipe 16 connected with a retort 17. Associated with the hopper base at its feeding end is the usual crusher block 18 and cleanout section 19. The feed screw is provided throughout the rear portion thereof extending through the hopper base with step-down flights 20 or less diameter than the feeding flights 21 located at the feeding end of the hopper. As shown in Fig. 1, from one to two of the feeding flights 21 extend inwardly beyond the crusher block 18 and it is to these flights that coal is fed both by the step-down flights 20 and by gravity for feeding into the conveyor pipe. Therefore, the feed is critical at this point and immediately in front of it so that the amount of coal reaching the feeding flights 21 may be controlled.

Since the coal to be fed may vary in density (ratio of weight to volume), and the size of the lumps or particles also becomes a controlling factor, a metering plate 22 is mounted to extend over the screw feed adjacent the feeding portion thereof for controlling the volume of coal received by the flight 21. Said plate is pivotally supported at one end by a pivot pin 23 to a bracket 24 secured to the bottom of the front wall of the hopper. The plate is of an inverted V-shape, as shown in Fig. 2, and is provided with a boss 25 intermediate its ends to receive the lower end of an adjusting rod 26 for adjusting the plate to different feed control positions about its pivotal mounting on the bracket 24. The rod 26 extends upwardly to a position whereby its upper end may be conveniently hooked in any one of a series of holes 27 formed in a flange 28 secured to the inner surface of the front wall of the hopper.

The holes 27 of said flange are so placed as to cause the plate to tilt downwardly from the horizontal or upwardly at predetermined angles. Thus, when the adjusting rod is in the central hole, the metering plate will be supported in horizontal position parallel with the feed screw. By changing the adjusting rod to holes above or below the central hole, the free end of the plate can be elevated or depressed from the horizontal position by increments of approximately 10°. Thus, in Fig. 2 the hole 27 immediately above the central hole is used, so the plate is elevated with a 10° angle. This adjustment needs only to be made when the type and character of coal or coke to be used is determined and the adjustment once made need not be changed unless a different type of coal is used. Such adjustment may be made, therefore, inside of the hopper when it is less than half full of fuel with the lid open.

A modified form of hopper or bin feed is shown in Fig. 3, wherein there is provided a hopper in the form of a fuel bin 110 in which the feed screw 112 operates the feeding flights 121. In this structure the transmission 114 is mounted outside of the bin and is adapted to drive the screw through the medium of the shaft 115 protected by the sleeve 116.

In this modification the metering plate 22 is similarly mounted over the feeding flight 121 and is provided with an adjusting rod 126 which extends through the front wall of the bin and a suitable angularly-arranged socket 127 mounted exteriorly thereof. By means of the nut 128 operating upon the screw threads 129, varying degrees of adjustment of the plate 22 may be obtained within limits of from 20 to 30 degrees above and below horizontal.

One example of the results obtained from provision of the metering plate and its manipulation as above described, is shown in Fig. 4. This comprises a chart comparing two selected test runs. In a stoker having an intermittently driven feed screw driven at 25 R. P. M. and rated at 400 pounds of coal per hour, and with no metering plate employed, the following readings were obtained:

(a) West Virginia coal 1″ minus with 60% slack (density of 57 pounds per cubic foot), the feed was at the rate of 482 pounds per hour or 82 pounds per hour greater than the rated capacity as indicated at A. On the other hand:

(b) Indiana coal 1½″ to ¾″ with no slack (density of 51 pounds per cubic foot), the rate of feed was only 324 pounds per hour or 76 pounds per hour short of the rated capacity as indicated at A′.

Thus, as between these two types of coal, everything else being equal, there was a difference of 158 pounds per hour.

This difference was equalized through adjustment of the metering plate whereby when said plate was raised 13 degrees above horizontal, for the Indiana coal, the rated capacity of feed was reached, as indicated at O′ (400 pounds per hour). When the West Virginia coal was used, by lowering the plate to approximately 13 degrees below horizontal, the rate of feed dropped to 400 pounds per hour, as indicated at O.

By adjusting the plate to horizontal, the rate of feed of the West Virginia coal was reduced from its rate of feed indicated at A to the rate of feed indicated at B (a reduction in rate of feed of 47 pounds per hour). On the other hand, with the metering plate in the horizontal position, the feeding rate of the Indiana coal was raised to the point indicated at B′ or 50 pounds per hour above its rate of feed without the plate.

It will, therefore, be observed that by the mere presence of the plate in its neutral horizontal position, the rate of feed of the West Virginia coal was substantially reduced, and the feed of the Indiana coal was substantially raised.

On the chart, Fig. 4, the point C indicates the rate of feed at 485 pounds per hour for the West Virginia coal when the plate is elevated 20 degrees above horizontal, as compared with the point C′, or 420 pounds per hour for the Indiana coal. When the plate is depressed to 20 degrees below horizontal, the feed of the West Virginia coal is reduced to the point indicated at D′ or 365 pounds per hour, as compared with the point D′ for the Indiana coal of 295 pounds per hour.

It will, therefore, be observed from the above that whereas the stoker would normally feed more cubic feet of fine coal than of coarse coal, and wherein variations in the size of the lumps would be a determining factor in the feed, by means of the metering plate adjusted to compensate for such variations in the type of coal, the feeding thereof may be so controlled as to neutralize such conditions and thereby prevent the difficulties of tight feed screws through overfeeding and "smoke back" by under feeding, as well as to increase the feed to the rating of the stoker in respect to certain types of coal, and reduce the feed to the rating of the stoker with other types of coal. The plate also has the effect of neutralizing the faster feeding from the crusher block end of the bin in the case of fine coal as compared with the faster feeding of the coarser coal from the opposite end.

It is also interesting to note in the comparison of the points B and B′ in the graph (Fig. 4) that by application of the metering place, when in its normal horizontal position, the Indiana coal feed is raised to 375 pounds per hour while the West Virginia coal feed is reduced to 435 pounds per hour, which is not far from the ratio of 57 to 51 comprising the density of the respective coals.

From this normal position, the metering plate can be adjusted to feed approximately 10% more or less than is fed at the normal setting, while the difference between the amount of fine coal or coarse coal fed at any given setting of the metering plate varies with the bulk density of the coal. In other words, the metering plate has removed the variable caused by coal size resulting in the stoker feeding an equal bulk of coal per unit of time, regardless of the size thereof.

The invention claimed is:

1. A metering device for a screw feed having a bin for containing solid materials provided with a rotatable feed screw in the bottom thereof, comprising an elongated plate extending generally longitudinally of and over a portion of the feed screw and spaced thereabove, means for pivotally supporting one end of said plate to the bin, and a member connected with said plate manually operable to swing the free end of said plate toward and away from said screw respectively to effect the feeding of solid materials thereby.

2. A metering device for a screw feed having a bin for containing solid materials provided with a rotatable feed screw in the bottom thereof, comprising an elongated plate extending over a portion of the feed screw and spaced thereabove, the lower surface of said plate being concave in cross section to extend over opposite sides of said screw, means for pivotally supporting said plate at one end thereof to the feeding side of the bin, and an adjusting rod having one end connected with said plate and the other end adjustably connected with said bin for manually swinging said plate about its pivotal mounting to a predetermined angular relation with the axis of the feed screw to effect the feeding of solid materials thereby.

3. A metering device for a screw feed having a bin for containing solid materials provided with a rotatable feed screw in the bottom thereof comprising an elongated inverted V-shaped plate extending longitudinally of and over that portion of the feed screw adjacent the feeding side of the bin, means for pivotally connecting one end of said plate to the bin for permitting variations in angular relation between said plate and feed screw, said plate normally extending horizontally in parallel relation with said screw slightly spaced above and from the feeding flights thereof, an adjusting rod pivotally connected with the upper portion of said plate, and an adjustable connection between the opposite end of said rod and said bin for permitting the free end of said plate to be swung toward and away from said screw and supported at a predetermined angle thereto whereby the relation of said plate to the screw will be such as to effect the feeding of solid materials thereby.

4. A metering device for a screw feed having a bin for containing solid materials provided with a rotatable feed screw in the bottom thereof, comprising an elongated plate extending generally longitudinally of and over a portion of the feed screw and spaced thereabove, means for pivotally supporting said plate within the bin for movement about its support into varying angular relations with said screw, and a member connected with said plate manually operable to adjust its angular relation to said screw to a predetermined angle for effecting the feeding of solid materials thereby.

5. A metering device for a screw feed having a bin for containing solid materials provided with a rotatable feed screw in the bottom thereof, comprising an elongated plate extending over a portion of the feed screw and spaced thereabove, means for pivotally supporting one end of said plate to a feeding side of the bin, and means connected with said plate operable to swing it about its pivotal mounting to a predetermined angular relation with the axis of the feed screw to effect the feeding of solid materials thereby.

JOHN ROLAND.